(12) United States Patent
Czarnecki et al.

(10) Patent No.: US 8,115,476 B1
(45) Date of Patent: Feb. 14, 2012

(54) APPARATUS FOR PROVIDING ENERGY USAGE AND ENERGY COST DATA FOR AN ELECTRICAL DEVICE

(75) Inventors: Neil A. Czarnecki, Mt. Pleasant, WI (US); David D. Flegel, Racine, WI (US); Jeffrey D. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 267 days.

(21) Appl. No.: 12/484,633

(22) Filed: Jun. 15, 2009

(51) Int. Cl.
*G01R 7/00* (2006.01)
(52) U.S. Cl. .................................................. 324/142
(58) Field of Classification Search .................... None
See application file for complete search history.

(56) References Cited

U.S. PATENT DOCUMENTS

| | | | |
|---|---|---|---|
| 4,120,031 A | 10/1978 | Kincheloe et al. | |
| 5,225,816 A * | 7/1993 | Lebby et al. | 340/653 |
| 5,315,236 A | 5/1994 | Lee | |
| 5,589,764 A * | 12/1996 | Lee | 324/157 |
| 6,095,850 A * | 8/2000 | Liu | 439/488 |
| 7,540,767 B1 * | 6/2009 | Czarnecki | 439/517 |
| 7,677,921 B2 * | 3/2010 | Czarnecki | 439/517 |
| 7,930,118 B2 * | 4/2011 | Vinden et al. | 702/64 |
| 2009/0230950 A1 * | 9/2009 | Czarnecki | 324/142 |

* cited by examiner

*Primary Examiner* — Jermele M Hollington
(74) *Attorney, Agent, or Firm* — Boyle Fredrickson, s.c.

(57) ABSTRACT

A power meter has a connector block with prongs for plugging the connector block into a wall socket and also has a socket for receiving the plug of a power cord of an electrical device. A display unit is tethered to the connector block such that values associated with energy usage of the electrical device may be shown on the display but remote from the wall socket. The power meter may calculate a cost associated with the energy usage of the device and display the cost information on the remote display.

17 Claims, 4 Drawing Sheets

APPARATUS FOR PROVIDING ENERGY USAGE AND ENERGY COST DATA FOR AN ELECTRICAL DEVICE

BACKGROUND OF THE INVENTION

The present invention relates generally to power meters and, more particularly, to an apparatus that provides energy usage and cost information regarding such energy usage for a single electrical device, such as an electrical appliance.

Single load electrical monitoring devices are designed to provide data regarding energy usage of a single electrical device, such an electrical appliance. Most such monitoring devices are typically referred to as power meters, but typically provide information on voltage and current, as well as power or wattage data regarding the electrical consumption of an electrical device. In addition to voltage, current, and wattage information, some power meters also provide cost information associated with the energy usage of the electrical device. These power meters allow a user to input per unit cost data associated with energy usage, such as a unit cost per kilowatt-hour, to the power meter and electronics within the power meter then determine and display a cost of operation of the electrical device based on the unit cost and the actual kilowatt usage of the electrical device.

Conventional single-load power meters are designed to be plugged into an electrical outlet, such as a wall outlet of a home, and have a socket into which the power cord of an electrical device is plugged. In this regard, the power meter includes a housing having a front side and a back side. The front side has a display for displaying energy usage and cost information and also has a socket for receiving the power plug of the electrical device. Prongs extend from the back side of the housing for plugging the power meter into the wall socket. Utility (or generator) power available at the wall socket may then be used to power the electrical device, and circuitry contained in the power meter monitors the power consumption to determine energy usage by the electrical device.

Since the prongs extend from the back side of the housing and the electrical device is plugged into the front side of the housing, there must be a line of sight to the general area of the wall socket to read the display of the power meter. This can be problematic when a power meter is used to measure the energy usage and display the cost of that usage for a large electrical device, such as a refrigerator, range, washer, dryer, or television, in which the sheer size of the electrical device obstructs a line of sight to the wall socket. To be used with such a large device, a homeowner thus must move the electrical device away from the wall socket until a line of sight is established. Furthermore, since most wall sockets for such devices are within 24 inches of the floor, the homeowner will typically have to lower himself to a possibly uncomfortable position to read the display on the face of the power meter.

SUMMARY OF THE INVENTION

The present invention is directed to a power meter that overcomes the aforementioned drawbacks of the prior art. More particularly, the present invention provides a power meter that includes a plug having prongs that are inserted into a conventional wall outlet. Opposite the prongs is an outlet socket into which the prongs of a power cable of an electrical appliance may be inserted. Electrical power from a power supply, e.g., utility grid, is communicated to the electrical appliance through the prongs, contacts in the plug, and the prongs of the power cable associated with the appliance. An energy monitor is connected to the plug via leads sheathed within a cable. The energy monitor includes circuitry that monitors the energy usage of the appliance, calculates values for various performance metrics, and displays those values on a display screen. The energy monitor is thus remote from the plug into which the appliance is connected, and is interconnected with the plug by the sheathed cable. In this regard, the housing for the socket to which the power cable of the appliance is connected is not formed as part of the housing for the energy monitor. This construction enables a user to plug the appliance into the wall outlet in a conventional manner, and then position the energy monitor at a location remote from the outlet. The user can then view the performance parameters without having visual access to the area adjacent the outlet, which is extremely advantageous when the outlet is obstructed by the appliance, such as in the case of a refrigerator or the like.

Therefore, in accordance with one aspect of the invention, an energy monitor for determining the energy usage of an electrical device and the cost of energy usage is provided. The energy monitor has a socket for receiving the power plug of an electrical device and has a prong arrangement for plugging the power meter into an electrical outlet. The power meter includes a display that displays a value associated with the cost of the energy usage by the electrical device. The display is remote from the electrical interconnection of the power meter to the electrical outlet and the power plug to the power meter. This allows the display to be read when a line of sight is not available to the electrical outlet, e.g., wall socket.

In accordance with another aspect of the invention, an apparatus for providing a visual indication of energy cost associated with use of an electrical device is provided. The apparatus includes an electrical splitter having a male end and a female end, with the male end adapted to be plugged into an electrical socket and the female end adapted to receive a power plug of the electrical device. The electrical device is powered when plugged into the female end and the male end is plugged into the electrical socket. The apparatus also includes a power meter having a display and is electrically connected to the electrical splitter and adapted to measure energy usage of the electrical device and display a value representative of the measured energy usage on the display. The display is tethered to the electrical splitter by an elongated cable and is therefore remote from the electrical splitter.

The present invention may also be embodied in a method for assessing the cost of the energy usage of a single electrical device. The method includes interconnecting a power meter between a power supply and the electrical device. Energy usage of the electrical device is determined and per unit cost information is used to determine a cost of operation for the electrical device. This cost information is displayed on a remote screen, such as an LCD screen.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION OF THE INVENTION

Figure 1:
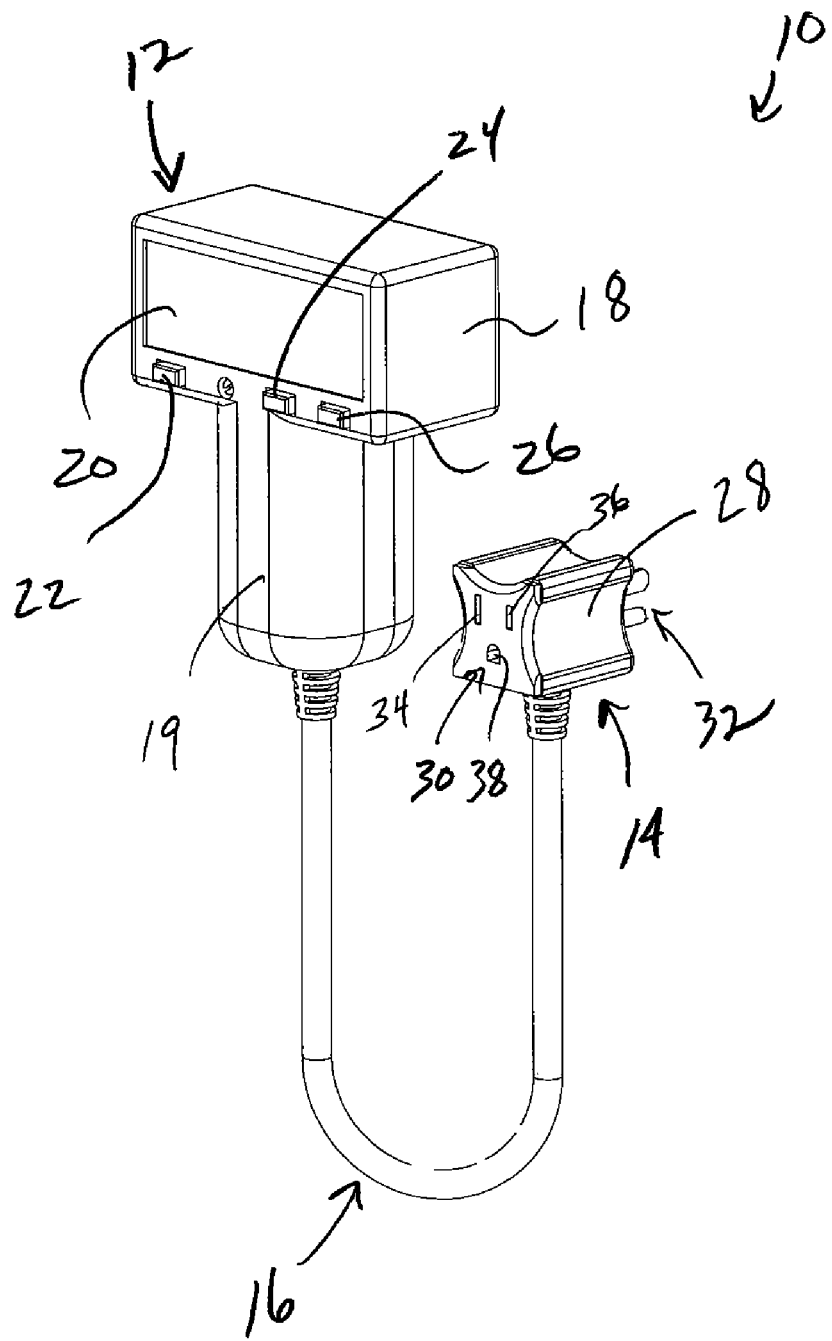
FIG. 1 is a front isometric view of a power meter according to one aspect of the invention.
Figure 2:
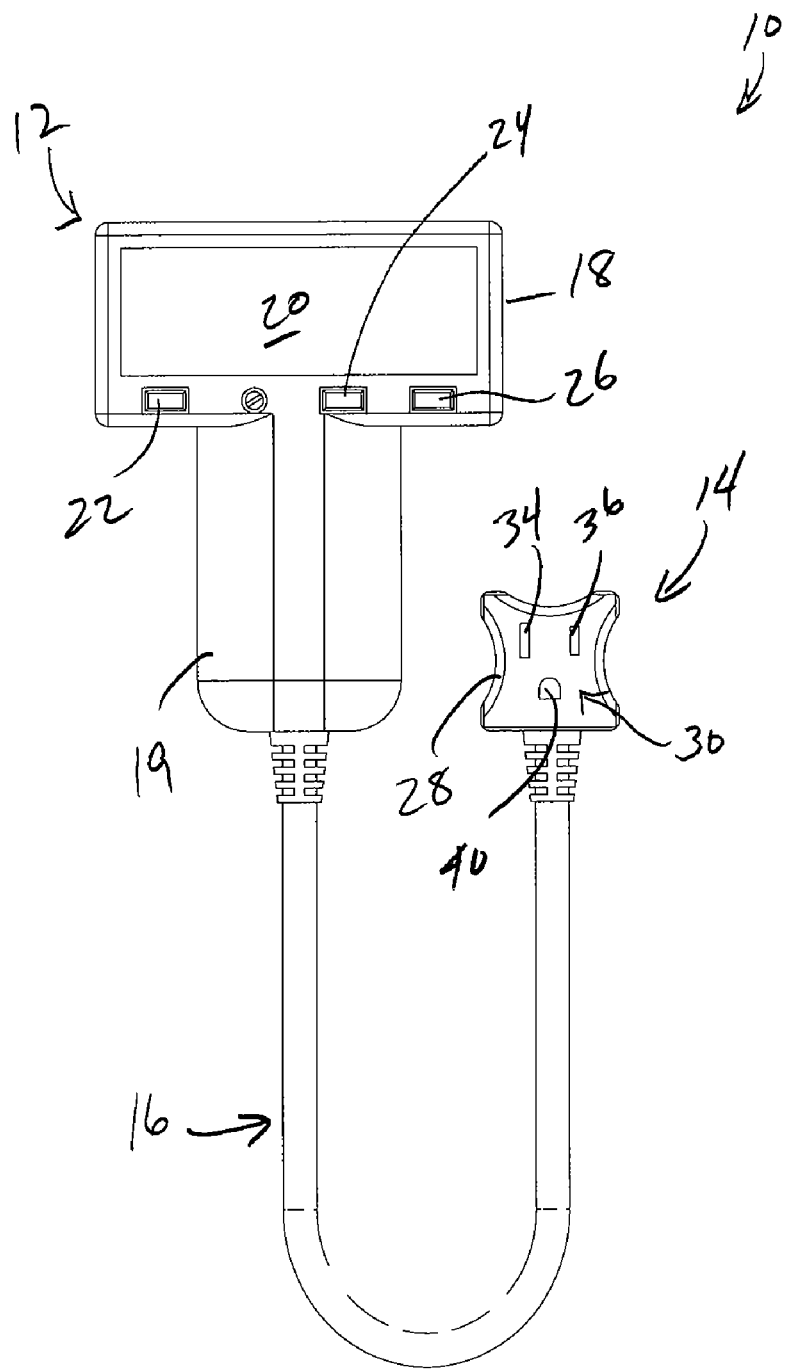
FIG. 2 is a front elevation view of the power meter shown in FIG. 1.
Figure 3:
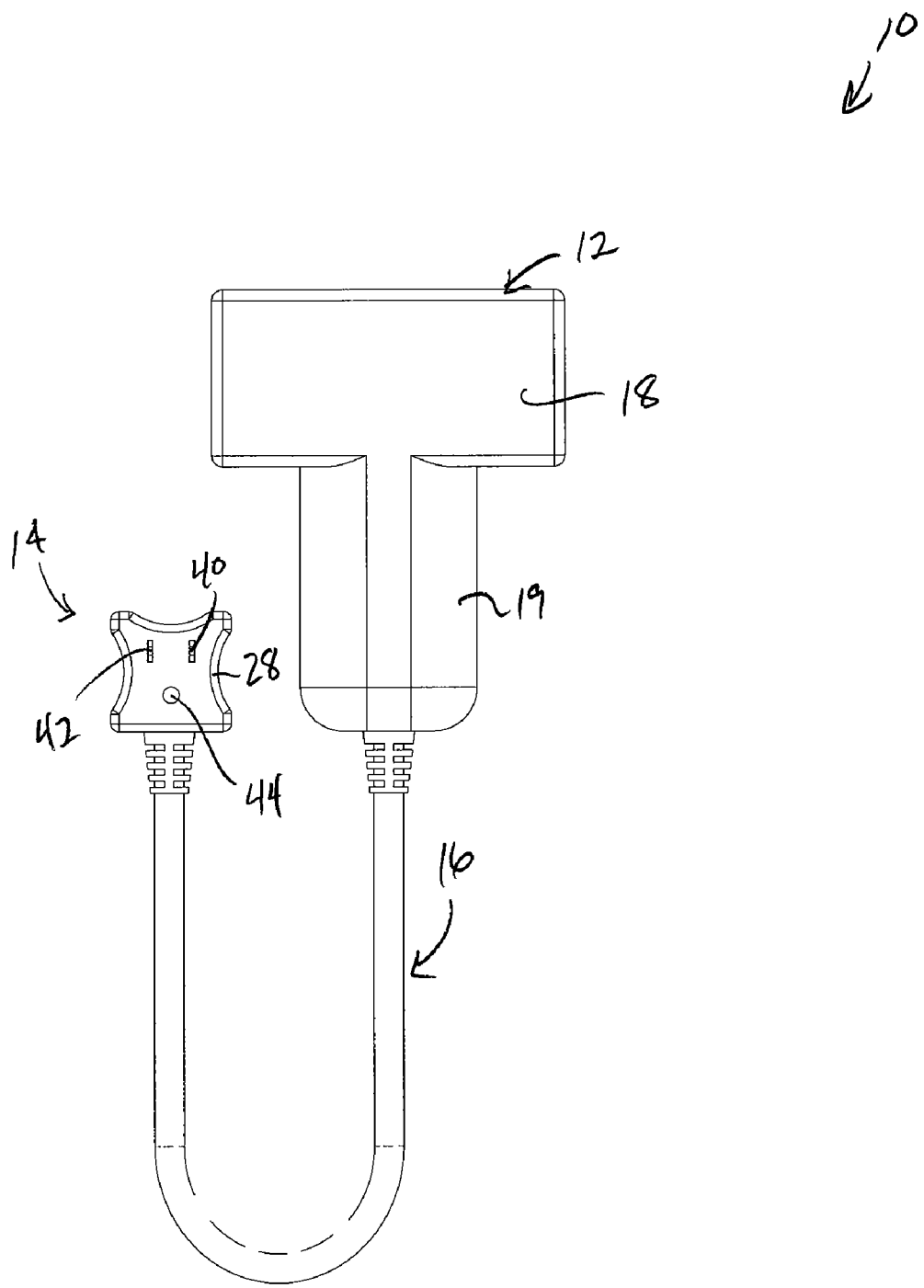
FIG. 3 is a rear elevation view of the power meter shown in FIG. 1.

Referring now to the drawings, a power meter 10 according to one embodiment of the present invention includes an energy monitor 12 coupled to a connector block 14 by an electrical cord 16. The energy monitor 12 has an upper housing 18 and a lower housing 19 that contain electronics and other electrical components for determining various performance parameters associated with energy usage of an electrical device (not shown), such as an electrical appliance. Circuitry for calculating such performance parameters is known in the art and therefore will not be described in greater detail. In a preferred embodiment, the power meter 10 includes a processor (not shown) and memory (not shown) contained within the upper housing 18. The processor is programmed to calculate various performance parameters for the electrical device based on voltage and/or current data acquired during operation of the electrical device.

The front of the upper housing 18 includes a display 20 that is preferably an LCD for displaying values for the various performance parameters. Extending from the upper housing 18 adjacent and below the display 20 are various input switches for controlling operation of the display 20 of the power meter 10. Switch 22 may be used to toggle through the various performance parameters. Switch 24 may be used to input data to the power meter 10, such as a per unit energy cost, that can be stored in memory, and switch 26 may be used to change the contrast of the display 20. It is understood that the power meter 10 may include additional switches or have switches having functionality different from those described herein. Furthermore, the power meter 10 may include additional displays, LEDs, buttons, and the like.

The connector block 14 has a main body 28 with a socket 30 formed in the front side of the main body 28 and a prong arrangement 32 formed on the back side of the main body 28. The socket 30 is designed to receive the three-prong plug of the power cord (not shown) of an electrical device (not shown). The prong arrangement 32 is designed to be inserted into a wall socket (not shown) or similar socket (not shown) that is provided with power, such as by a utility grid or electrical generator. Preferably, the prong arrangement 32 is inserted into a wall socket but it is contemplated that the prong arrangement 32 could be inserted into a socket contained in a power strip (not shown) or any other electrical outlet.

The socket 30 includes a neutral conductor 34, a live (hot) conductor 36, and a ground conductor 38 that are electrically connected to prongs 40, 42, and 44 of the prong arrangement, respectively, such that current may flow from a power source (not shown) to the prongs 40, 42, and 44 and then to the conductors 34, 36, and 38 to power the electrical device whose power cord (not shown) is plugged into the socket 30.

As mentioned above, the energy monitor 12 is coupled to the connector block 14 by an electrical cord 16. The electrical cord 16 allows the energy monitor 12, and thus display 20, to be remote from the electrical socket (not shown) into which the prong arrangement 32 is plugged, which is particularly convenient for electrical devices, such as refrigerators, ranges, televisions, washers, and dryers, in which the size of the electrical device can obstruct the view to the electrical socket. The electrical cord 16 provides a secure sheathing for electrical leads (not shown) extending from the connector block 14 to the energy monitor 12. The electrical leads connect to circuitry contained in lower housing 19. As noted above, the energy monitor 12 includes a processor or other processing device for calculating additional performance parameters associated with operation of the electrical device. In a preferred embodiment, the lower housing 19 contains circuitry to provide digital level inputs to the processor as well as power to the processor and display 20. The processor reads a unit cost value from memory and with a value associated with energy consumption of the electrical device, e.g., wattage, and determines a cost associated with operation of the electrical device. The cost information may then be shown on display 20.

It is contemplated that the processor may also determine and display other values associated with the operational cost of the electrical appliance. For example, instantaneous cost could be displayed as well as a cumulative cost total for a given operational period, e.g., day, week, month, or year. Other values associated with operation of the electrical device may also be displayed, such as voltage value, current value, wattage, kilowatt-hours, etc.

In a preferred embodiment, electronics of the power meter 10 are powered from the power that is provided by the power supply to the electrical device through the connector block 14. Additionally, while the invention has been described with respect to measuring and displaying cost information associated with usage of a single electrical device, it is understood that the power meter 10 could be used to measure energy usage and determine energy cost for more than one electrical device. For example, the power meter 10 could have another electrical cord connected to another connector block that may be plugged into an electrical outlet and into which an electrical device may be plugged. The power meter 10 may include circuitry for determining usage and cost information for the electrical devices independently or provide cumulative cost information for both devices. In this regard, a toggle button (not shown) may be provided on the housing to toggle between the electrical devices or to show cumulative data. Alternately, the display may be segmented such that values associated with both electrical devices are shown automatically and simultaneously.

As noted above, the energy monitor 12 has an upper housing 18 and a lower housing 19. In one embodiment, the upper and lower housing are integrally formed as a single unit. In an alternate embodiment, the upper and lower housing are separate components that may be mechanically coupled when the usage information for a particular appliance is desired. That is, in one alternate embodiment, the upper housing 18 connects to the lower housing 19 by a pinned coupling (not shown) that includes readout and power pins (not shown). The power pins facilitate powering of the processor and the display of the upper housing 18 and the readout pins facilitate the transference of data from circuitry in the lower housing 19 to the processor or other circuitry of the upper housing 18. Thus, the invention may be embodied in a kit that contains a single upper housing 18 but multiple lower housing-cord-connector block integrated units. Since a home may include multiple electrical devices that are plugged into hard-to-reach electrical sockets or are generally heavy and difficult to move, the aforedescribed kit allows the homeowner to initially install the integrated units for the various electrical devices, but then selectively connect the upper housing to the integrated unit associated with the electrical device whose energy usage is to be determined.

Figure 4:
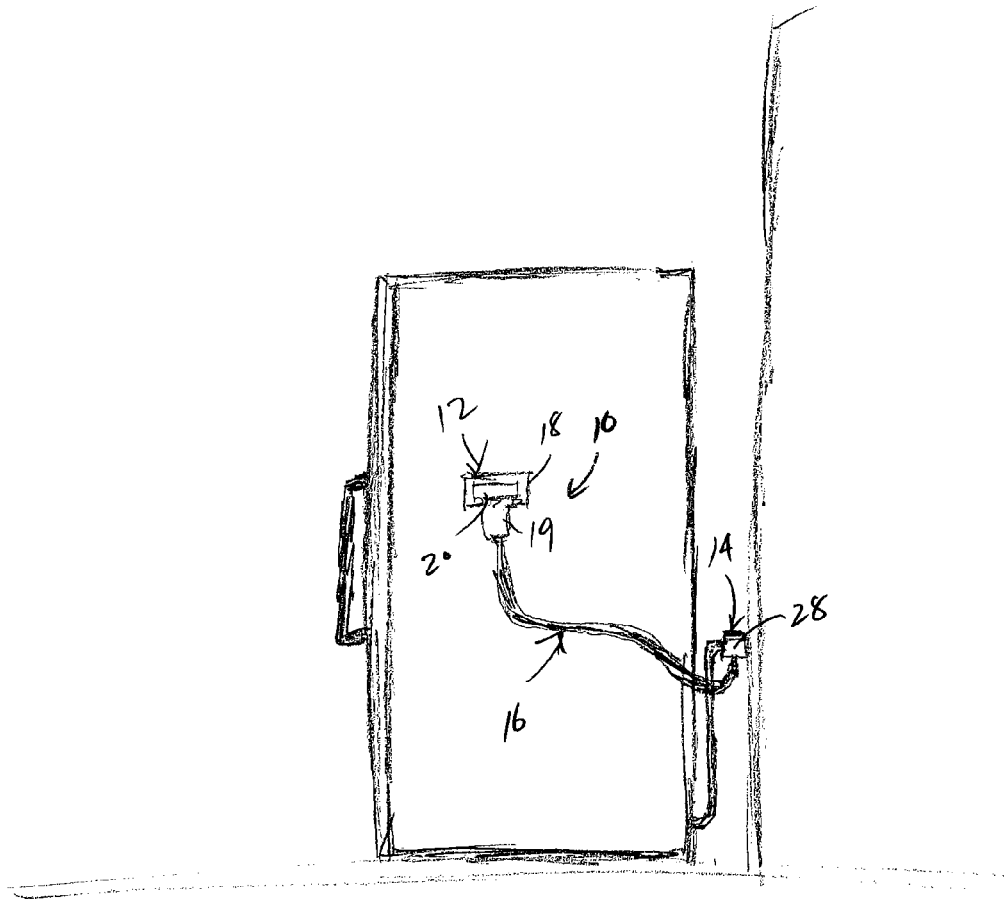
FIG. 4 is a side elevation view of an appliance, in the form of a refrigerator, having a power meter according to the present invention supported by the refrigerator.

While the described power meter may be used with a number of electrical devices, it is envisioned that the power meter 10 is particularly well suited for use with large appliances such as a refrigerator, ranges, washers, and dryers. These appliances generally have a metallic shell. Thus, in one preferred embodiment, the power meter 10 has a magnet (not shown) within the upper housing 18 or affixed to a side of the upper housing 18 to allow temporary mounting of the energy monitor 12 to the shell of the appliance, such as illustrated in FIG. 4.

Many changes and modifications could be made to the invention without departing from the spirit thereof. The scope of these changes will become apparent from the appended claims.

We claim:

1. A display device for providing a visual output of at least one parameter associated with the supply of electrical power to an electrically operated device, comprising:
    a housing that includes a display area for displaying information relating to the at least one parameter associated with the supply of electrical power to the electrically operated device;
    circuitry disposed within the housing for providing an output to the display area relating to the at least one parameter associated with the supply of electrical power to the electrically operated device;
    an elongated cord having a first end extending from the housing and interfacing with the circuitry and a second end having an electrical connector adapted to be connected to a source of electrical power, the elongated cord containing electrically conductive wire; and
    an electrical connection area associated with the second end of the elongated cord and adapted to engage a mating connector of a power cord of the electrically operated device, wherein the electrical connection area is electrically connected to the connector such that when the connector is connected to the source of electrical power and the mating connector of the power cord is engaged with the electrical connection area the electrically operated device may be powered.

2. The display device of claim 1 wherein the connector and the electrical connection area are remote from the housing.

3. The display device of claim 1 wherein the electrical connection area is adapted to receive a 3 pronged mating plug.

4. The display device of claim 1 wherein the connector includes a hot conductor, a neutral conductor, and a ground conductor.

5. The display device of claim 1 further comprising a block at the second end of the electrical cord, and wherein the block has a front face and a rear face, and wherein the connector extends from the rear face and the electrical connection area is formed in the front face.

6. The display device of claim 1 further comprising at least one switch on the housing that is responsive to a user input to allow a user to select one of multiple parameters associated with of the supply of electrical power to the electrically operated device.

7. The display device of claim 6 wherein the at least one switch enables a user to input a per unit energy cost that can be used by the circuitry to calculate the cost of the supply of electrical power to the electrically operated device.

8. The display device of claim 1 wherein the circuitry is capable of determining at least one of:
    instantaneous electrical power supply to the electrically operated device;
    average electrical power supply to the electrically operated device over a measurement period;
    instantaneous cost of electrical power supply to the electrically operated device;
    average energy cost of electrical power supply to the electrically operated device over a measurement period; and
    cumulative energy cost of electrical power supply to the electrically operated device for a measurement period.

9. The display device of claim 1 wherein the display area includes an LCD display.

10. An apparatus for providing a visual indication of energy usage for an electrical device, comprising:
    an electrical connector having a first end and a second end, the first end adapted to be connected to a source of electrical power and the second end adapted to engage a mating connector of a power cord of the electrical device, and wherein the electrical device is powered when the mating connector is engaged with the second end and the first end is connected to the source of electrical power; and
    a display device connected to the electrical connector by an elongated cord and having a display adapted to display at least one parameter associated with the supply of electrical power to the electrical device.

11. The apparatus of claim 10 wherein the display device includes circuitry to measure current flow between the source of electrical power and the mating connector, determine energy consumption by the electrical device, and calculate a cost of the energy consumption by the electrical device.

12. The apparatus of claim 11 wherein the display device is configured to display a value representative of the cost of the energy consumption.

13. The apparatus of claim 11 wherein the display device includes at least one switch that allows selection between two or more parameters associated with the supply of electrical power to the electrical device.

14. The apparatus of claim 10 wherein the display includes an LCD.

15. A method for determining a cost associated with powering an electrical device, comprising:
    plugging an electrical connector of the electrical device into an end of a power cord, the end having an electrical connection area for receiving the electrical connector and having an electrical connector for connecting the power cord to a source of electrical power;
    connecting the electrical connector of the power cord to the source of electrical power; and
    displaying information relating to at least one parameter associated with the supply of electrical power to the electrical device on a display that is connected to the power cord and remote from the connection of the electrical connector of the power cord to the source of electrical power.

16. The method of claim 15 further comprising selectively displaying information relating to multiple parameters associated with the supply of electrical power to the electrical device.

17. The method of claim 15 further comprising receiving an input of a per unit energy cost associated with the supply of electrical power by the source of electrical power and displaying a value related to the energy usage of the electrical device.

* * * * *